United States Patent Office 3,010,955
Patented Nov. 28, 1961

3,010,955
RECOVERY OF SAPOGENINS
John Harold Chapman, Ruislip, Albert Charles Thomas Hickman, Uxbridge, and John Dennis Erskine Nelson, Barnard Castle, England, and Walter Wolff, Tanga, Tanganyika, assignors to Glaxo Laboratories Limited, Greenford, England, a British company
No Drawing. Filed Dec. 23, 1960, Ser. No. 77,788
Claims priority, application Great Britain Jan. 1, 1960
14 Claims. (Cl. 260—239.55)

This invention is concerned with improvements in or relating to the recovery of sapogenins from natural sources.

Various sapogenins are of considerable value in the synthesis of steroids, e.g. steroids of the adreno-cortical series, such as cortisone, and compounds related thereto, e.g. prednisone. Sapogenins are present in certain plants in the form of the corresponding glycosides, i.e. the sapogenins, and much effort has been devoted to the recovery of sapogenins from natural sources in order to obtain these important raw materials in good purity and high yield.

A sapogenin which is of particular importance is hecogenin which can be recovered from various plants, particularly *Agave sisalana* and related plants. Thus, after decortication of sisal leaves and squeezing the waste, a considerable volume of plant juice is obtained and, by subjecting this juice and the resultant products to various treatments, one can obtain hecogenin, usually as the acetate, in a fairly high state of purity for subsequent use as an intermediate as described above. One method for the recovery of hecogenin from plant juice containing the parent heconin involves allowing the juice to autolyse by enzymatic fermentation whereby a slurry is formed and then hydrolysing the slurry to yield a crude product from which hecogenin can be obtained, e.g. by solvent extraction. This process, whilst possessing a number of attractive features, suffers from a serious disadvantage in that the slurry formed by autolysis cannot readily be concentrated or separated from the supernatant liquor by conventional methods of filtering or centrifugation. Whilst some of the supernatant liquor can be removed by decanting, a significant proportion remains and this leaves a bulky residual slurry for the subsequent step of hydrolysis. Where, for example, acid hydrolysis is used, the quantity of acid required to produce the necessary degree of acidity is substantially greater than would be the case if greater concentration could be effected.

Further, where one desires to use the process described in specification No. 797,384 in order to effect hydrolysis a small volume of slurry is desirable, since the smaller the volume of slurry to be hydrolysed, the lesser is the quantity of heat required.

We have now found that the slurries obtained by the autolysis of saponin-containing plant juices are brought into a form more readily separated into solid and liquid phases (e.g. by filtration, centrifugation etc.) by adding a phenol thereto. Thus we have found that the addition of a phenol to a slurry of the kind referred to can effect either gelling of the solids or actual sedimentation, the result depending both on the quantity and the nature of phenol used. Whether gelling or sedimentation takes place, the resultant liquid can be more readily separated into component solid and liquid phases, for example by filtration or centrifugation.

According to the invention, therefore, there is provided a process for the treatment of a sapogenin-containing slurry produced by the autolysis of a saponin-containing plant juice to render said slurry more readily separable into solid and liquid phases, in which a phenol is added to the slurry before or after completion of the autolysis.

Preferably, for reasons which will be explained below, the slurry arising from this autolysis stage should first be separated from as much of the residual liquor as possible, e.g. by decantation, and the phenol added to the residual slurry to form the resultant mass which can then be separated from the residual liquor.

It is preferred to allow the autolysis to be substantially complete before adding the phenol and it is particularly preferred first to remove the supernatant liquor, so far as is possible, and then add the phenol to the residue to transform the sludge into a more readily separable mass.

The phenol is normally added to the slurry at ambient temperature, e.g. 23–33° C., and gelatinisation or sedimentation commences in 0.5 to 3 hours. If relatively dilute concentrations of phenols are employed, the time required to produce a gel or sediment may be considerably longer e.g. up to 48 hours. It is advisable to leave the treated slurry to stand for at least 6 hours and preferably overnight before filtering.

To ensure proper mixing, the phenol is preferably added in liquified form e.g. in admixture with alcohol or diluted with water.

The amount of the phenol required cannot be specified in general terms since the factors involved are various, and must hence be determined by experiment for a given batch of slurry. For example, the nature of the juice varies considerably from day to day. Moreover, greater amounts of the phenol are required for thin slurries than for thick slurries, for example with one thick slurry 1% v./v. of common phenol was required whereas with a thin slurry common phenol additions as high as 5% v./v. were apparently required.

It is important to note that the effect of adding a phenol to the slurry not only varies with the amount of phenol but also varies from phenol to phenol. Thus most phenols will cause a gel to form at lower concentrations and a sediment to form at higher concentrations. On the other hand, some phenols, particularly the xylenols, apparently do not form a gel at any stage but produce a sediment even at relatively low concentrations.

Contrary to expectations, where gels are formed by phenols they are, in general, readily separable from the residual liquor, e.g. by filtration or centrifugation although the gel-bound mass does occlude some liquor. Where sedimentation takes place the sediments which are obtained are, in general, readily separated from most of the supernatant liquor by decantation and any residual liquor can be removed by filtration leaving a compact filter cake. This is important since it enables one to effect ready separation with the minimum use of filtration apparatus. The process according to the invention will normally be effected in the region where the saponin-containing plant is grown; it is clearly undesirable to have to use large scale filtration apparatus in such regions. The present invention enables one to keep filtration to a minimum in such circumstances.

In view of the advantages to be obtained with sediments rather than gels, we particularly prefer to use a xylenol, e.g. 3,5-xylen-1-ol, 2,6-xylen-1-ol or 3,4-xylen-1-ol, as the phenol in the process according to the invention, although other phenols may be used in amounts which will cause sediments to form.

Phenols which may be used in the process according to the invention include those set out in examples below. The phenols need not be in pure form but may be used in the form of fractions obtained industrially e.g. coal-tar fractions. They may also be used in the form of substitution products e.g. resins or glycosides providing that these are in a form in which they can be reacted with the slurry. Generally phenols of the benzene and naphthalene series are preferred.

The process according to the invention is of particular value in the recovery of hecogenin from sisal juice although it may be used for the recovery of other sapogenins from other sources.

In order that the invention may be well understood, the following examples are given by way of illustration only:

*Example 1*

100 litres of clear fresh sisal juice obtained as a by-product from the decortication of sisal leaves were allowed to autolyse for two days. The juice was then stirred vigorously for about 1 hour and allowed to settle. The almost clear, supernatant liquor was decanted on the 4th, 5th and 6th days. 47 ml. of 80% aqueous common phenol solution was then added to the remaining slurry of 25 litres. After not less than six hours the resultant gel was stirred and filtered under gravity.

*Example 2*

The procedure of Example 1 was repeated except that two batches of slurries from two sources were used. At the filtration stage, the rate of filtration was observed and compared with the rate of filtration of fresh, untreated, slurry. Filtration was effected through Terylene filter bags.

| Total time of filtration, Hours | Slurry No. 1— 20 litres | | Slurry No. 2— 25 litres | |
|---|---|---|---|---|
| | Fresh slurry | Phenolised slurry | Fresh slurry | Phenolised slurry |
| | Volume of filtrate (litres) | | Volume of filtrate (litres) | |
| 1 | 2.2 | 7.6 | 3.3 | 7.7 |
| 2 | 2.8 | 9.6 | 4.7 | 10.4 |
| 5 | 3.8 | 12.4 | 6.5 | 13.2 |
| 16 | 5.5 | 14.1 | 9.2 | 16.3 |
| 24 | | | 10.3 | 16.9 |
| Volume of residual slurry | 14.2 | 5.3 | 12.9 | 7.0 |
| Evaporation loss | 0.3 | 0.6 | 1.8 | 1.1 |

*Example 3*

300 gallons of a rather thick autolysed slurry were mixed with 2.75 litres of 80% aqueous common phenol. After standing for 21 hours, the mixture was pumped into a sail-cloth bag suspended in a cylindrical wire mesh frame. The volume of residual slurry was measured and gave the following volumes:

Gallons
24 hours' filtration _____ 170
48 hours' filtration _____ 137
72 hours' filtration _____ 125

*Example 4*

The procedure of Example 3 was repeated except that a thinner slurry was used. Measurements of this filtration rate were again taken at intervals and the following results were obtained

| Total time of filtration | Filtration rate, litre/hour | Slurry volume in litres |
|---|---|---|
| 0 | 0 | 1,360 |
| 1 | 43 | 1,290 |
| 3 | 36 | 1,210 |
| 6 | 34 | 1,110 |
| 20 | 20 | 690 |
| 25 | 11 | 635 |
| 29 | 10 | 590 |
| 48 | 3 | 525 |
| 70 | ¾ | 485 |

*Example 5*

To 100 ml. of autolysed sisal juice slurry, 6 ml. of 85% aqueous common phenol was added (thus giving a final phenol concentration of 4.8%). After an hour marked settling had begun and when allowed to stand for 12–16 hours a compact, solid lower layer had formed, with a clear and almost colourless upper layer. The lower layer comprised about one-third of the total volume. The upper layer could be readily separated by decantation.

Following the procedures of the previous examples a series of tests were carried out on samples of autolysed sisal juice slurry to ascertain (a) the maximum concentration of a phenol tested at which no reaction took place, (b) the minimum concentration of a phenol tested at which gelling would take place, and (c) the minimum concentration of a phenol tested required to produce a sediment. The results of the tests are set out in the following table.

| Phenol used | Result | | |
|---|---|---|---|
| | (a) Percent | (b) Percent | (c) Percent |
| phenol | 0.05 | 0.1 | 6.0 |
| o-cresol | 0.05 | 0.1 | 1.0 |
| m-cresol | 0.05 | 0.1 | 2.0 |
| p-cresol | 0.025 | 0.05 | 2.0 |
| 3,5-xylen-1-ol | | | 0.6 |
| 2,6-xylen-1-ol | | | 0.6 |
| 3,4-xylen-1-ol | | | 0.5 |
| o-chlorophenol | | 0.1 | 2 |
| p-chlorophenol | 0.1 | 0.2 | 1.0 |
| o-bromophenol | | 0.2 | 1.0 |
| p-bromophenol | 0.2 | | 1.0 |
| 2,4-dichlorophenol | 0.2 | | 0.3 |
| pentachlorophenol | 0.2 | | 0.5 |
| 4-ethylphenol | 0.5 | | 1.0 |
| 4-isopropylphenol | 0.5 | | 1.0 |
| 4-sec-butylphenol | 0.5 | | 1.0 |
| 4-tert-butylphenol | 0.2 | | 0.5 |
| 4-cyclohexylphenol | 1.0 | | 2.0 |
| 4-tert-octyl-2-methylphenol | 0.5 | | 1.0 |
| 4-methyl-2,6-di-t-butylphenol | 0.6 | | 0.8 |
| 1,3-dihydroxynaphthalene | 0.5 | | 1.0 |
| α-naphthol | | 0.2 | |
| β-naphthol | | 0.2 | |
| m-nitrophenol | 1.0 | | 2.0 |
| p-nitrophenol | | 0.2 | |
| catechol | 0.8 | | 4 |
| resorcinol | 0.2 | 0.8 | 4 |
| hydroquinone | 0.2 | 0.5 | |
| pyrogallol | 0.8 | | 4 |
| phloroglucinol | 2.0 | | 5 |
| guaiacol | 2.0 | | 5 |
| p-chloro-m-cresol | 0.5 | | 1 |
| salicylic acid | 2.0 | | 4 |
| m-aminophenol | 0.2 | 0.5 | |
| picric acid | 1.0 | | 2.0 |
| tannic acid | 1.0 | 2.0 | |

It should be understood that since sisal juice is a natural material its constitution is variable from day to day and also according to the part of the plant from which it is obtained. Moreover it is subject to bacterial contamination on standing for any length of time and the results set out in the foregoing examples may not be obtained with samples from other sources. The quantity of phenol required in any given case can of course be determined by preliminary trial and experiment as previously explained.

We claim:

1. In a process for the treatment of a slurry containing hecogenin, produced by the autolysis of a heconin-containing plant juice, to render said slurry more readily separable into solid and liquid phases the step which comprises adding a phenol to the slurry after autolysis has commenced.

2. A process as claimed in claim 1 in which the phenol is added to the slurry before the completion of the autolysis.

3. A process as claimed in claim 1 in which the phenol is added to the slurry after completion of the autolysis.

4. A process as claimed in claim 1 in which the slurry is separated from as much of the residual liquor as possible before the phenol is added to the slurry.

5. A process as claimed in claim 4 in which said residual liquor is separated from the slurry by decantation.

6. A process as claimed in claim 1 in which the slurry is at a temperature of from 23 to 33° C. during the addition of the phenol.

7. A process as claimed in claim 1 in which said phenol is in liquified form.

8. A process as claimed in claim 7 in which said phenol is diluted with water.

9. A process as claimed in claim 7 in which said phenol is used in admixture with alcohol.

10. A process as claimed in claim 1 in which said phenol is a phenol selected from the group consisting of the benzene and naphthalene series.

11. A process as claimed in claim 10 in which said phenol is monohydroxybenzene.

12. A process as claimed in claim 10 in which said phenol is a xylenol.

13. A process as claimed in claim 10 in which said phenol is a xylenol selected form the group consisting of 3,5-xylen-1-ol, 2,6-xylen-1-ol and 3,4-xylen-1-ol.

14. A process as claimed in claim 1 in which said heconin-containing plant juice is sisal juice.

No references cited.